US 7,471,896 B2

United States Patent
Cho et al.

(10) Patent No.: US 7,471,896 B2
(45) Date of Patent: Dec. 30, 2008

(54) OPTICAL TRANSPONDER AND METHOD FOR DETECTING AND TREATING ERRORS IN OPTICAL CHANNEL SUBLAYER OF THE OPTICAL TRANSPONDER

(75) Inventors: Yun Hee Cho, Daejeon (KR); Joon Ki Lee, Daejeon (KR); Seung Il Myong, Daejeon (KR); Jyung Chan Lee, Daejeon (KR); Kwangjoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 914 days.

(21) Appl. No.: 10/903,053

(22) Filed: Jul. 30, 2004

(65) Prior Publication Data

US 2005/0135805 A1    Jun. 23, 2005

(30) Foreign Application Priority Data

Dec. 18, 2003    (KR) ...................... 10-2003-0093102

(51) Int. Cl.
*H04B 10/08*    (2006.01)
(52) U.S. Cl. ......................................... 398/17; 398/30
(58) Field of Classification Search .............. 398/17–24, 398/30
See application file for complete search history.

(56) References Cited

U.S. PATENT DOCUMENTS 6,850,660 B2 * 2/2005 Notani ........................ 385/16

2005/0068995 A1 * 3/2005 Lahav et al. ................ 370/539

FOREIGN PATENT DOCUMENTS

| KR | 000010138 A | 2/2000 |
|---|---|---|
| KR | 000044503 A | 7/2000 |
| KR | 1020010064019 | 7/2001 |
| KR | 1020020077000 | 10/2002 |
| KR | 1020030056289 | 7/2003 |
| KR | 10-2004-0058629 | 7/2004 |

OTHER PUBLICATIONS

First International Conference on Optical Communications and Networks, pp. 289-291, Yunhee Cho et al., "An Overhead Processing Model for OCh-level OAM," Nov. 12-14, 2002.

* cited by examiner

*Primary Examiner*—Christina Y Leung
(74) *Attorney, Agent, or Firm*—Blakely, Sokoloff, Taylor & Zafman LLP

(57) ABSTRACT

Provided are an optical transponder that processes a G.709 frame that includes an overhead for operation, administration, and maintenance of an optical channel and an overhead for forward error correction, and a method of detecting and treating errors in optical-channel sublayers of the same. The method includes detecting an error signal or a maintenance signal from a G.709 frame that includes an overhead for operation, administration, and maintenance of an optical channel and an overhead for forward error correction; treating errors in a predetermined layer of a plurality of layers that requires error treatment when the error signal or the maintenance signal is detected or canceled; and investigating a reason for the errors in the predetermined layer.

14 Claims, 7 Drawing Sheets

OPTICAL TRANSPONDER AND METHOD FOR DETECTING AND TREATING ERRORS IN OPTICAL CHANNEL SUBLAYER OF THE OPTICAL TRANSPONDER

This application claims the priority of Korean Patent Application No. 2003-93102, filed on Dec. 18, 2003, in the Korean Intellectual Property Office, the disclosure of which is incorporated herein in its entirety by reference.

BACKGROUND OF THE INVENTION

1. Field of the Invention

The present invention relates to a method of managing an optical transport network (OTN), and more particularly, to an apparatus and method for detecting and treating errors in an optical transponder connected to an OTN.

2. Description of the Related Art

An explosive growth in the Internet traffic greatly increases network traffic, thereby threatening the capacity of a backbone network. To solve this problem, a technique of extending an optical fiber network using Wavelength Division Multiplexing (WDM) has been introduced.

Conventionally, an optical signal with a single wavelength is transmitted through an optical fiber. However, in WDM, a transmitting side multiplexes and transmits optical signals with different wavelengths through an optical fiber and a receiving side splits the optical signals according to their wavelengths. Accordingly, it is possible to increase the capacity of an optical fiber N times using WDM, without further optical fibers and a repeater.

An optical transponder is installed in a transmitting side of such an optical transmission network so as to convert wavelengths of optical signals input from a Synchronous Digital Hierarchy (SDH) system into different WDM wavelengths. The optical transponder generally names an optical transmitter and an optical receiver that convert an optical signal into an electrical signal and then into an optical signal. In general, an optical transponder includes two optical transceivers that perform transmission of an upward/downward signal.

Development of Dense Wavelength Division Multiplexing (DWDM) increases a data transmission rate per optical channel from 2.5 Gbps to 10 Gbps and very soon to 40 Gbps. An increase in the transmission rate via an optical channel triggers a need for reliable operation of an optical channel. In this connection, a digital wrapper that supports a frame structure of a sublayer of an optical channel, suggested in the ITU-T G.709 recommendation, has been recently developed to improve the reliable operation and optical transmission performance of the optical channel.

The digital wrapper according to the ITU-T G.709 recommendation allows various tributary signals, such as an SDH/Synchronous Optical NETwork (SONET) signal and an Ethernet interface signal, (hereinafter referred to as a "G.709 OTN frame") to be transmitted through an optical channel, regardless of a frame structure. Also, the digital wrapper performs Operation, Administration, and Maintenance (OAM) of an optical signal during transmission of the optical signal including an overhead for OAM of the optical channel and an overhead for forward error correction (FEC), and improves the performance of signal transmission.

Use of a G.709 frame allows operation of overheads for layers of an Optical Transport Unit (OTU), an Optical Data Unit (ODU), and an Optical Payload Unit (OPU), and a total of eight optical channel sublayers of each of the layers to be independently operated according to a user's need. However, although a total number of optical channel sublayers of the respective layers that can operate increases, it is difficult to prevent the increased sublayers from being weighed with load.

In particular, load is likely to be weighed on an optical channel when an error occurs therein. This is because the respective layers may undergo errors independently, and a number of errors occurred is proportional to that of layers of the optical channel. Accordingly, for more reliable operation of the optical channel, there is a strong need for development of an optical transport system that can immediately inform a user of the occurrence of an error in a layer of the optical channel and effectively treat the error.

SUMMARY OF THE INVENTION

The present invention provides an apparatus and method for effectively detecting and treating an error signal or a maintenance signal from optical channel sublayers so as to effectively monitor and manage an optical channel in an optical transponder with a G.709 Optical Transport Network (OTN) frame.

According to one aspect of the present invention, there is provided an optical transponder comprising an optical-channel operating unit, wherein the optical-channel operating unit comprises an error detector detecting an error signal or a maintenance signal from a G.709 frame that includes an overhead for operation, administration, and maintenance of an optical channel and an overhead for forward error correction; an error treatment unit treating errors in a predetermined layer of a plurality of channels that requires error treatment when the error signal or the maintenance signal is detected or canceled; and an error correlation investigator investigating a reason for the errors in the predetermined layer.

According to another aspect of the present invention, there is provided a method of detecting and treating errors in an optical-channel sublayers of an optical transponder, comprising: (a) detecting an error signal or a maintenance signal from a G.709 frame that includes an overhead for operation, administration, and maintenance of an optical channel and an overhead for forward error correction; (b) treating errors in a predetermined layer of a plurality of layers that requires error treatment when the error signal or the maintenance signal is detected or canceled; and (c) investigating a reason for the errors in the predetermined layer.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 1:
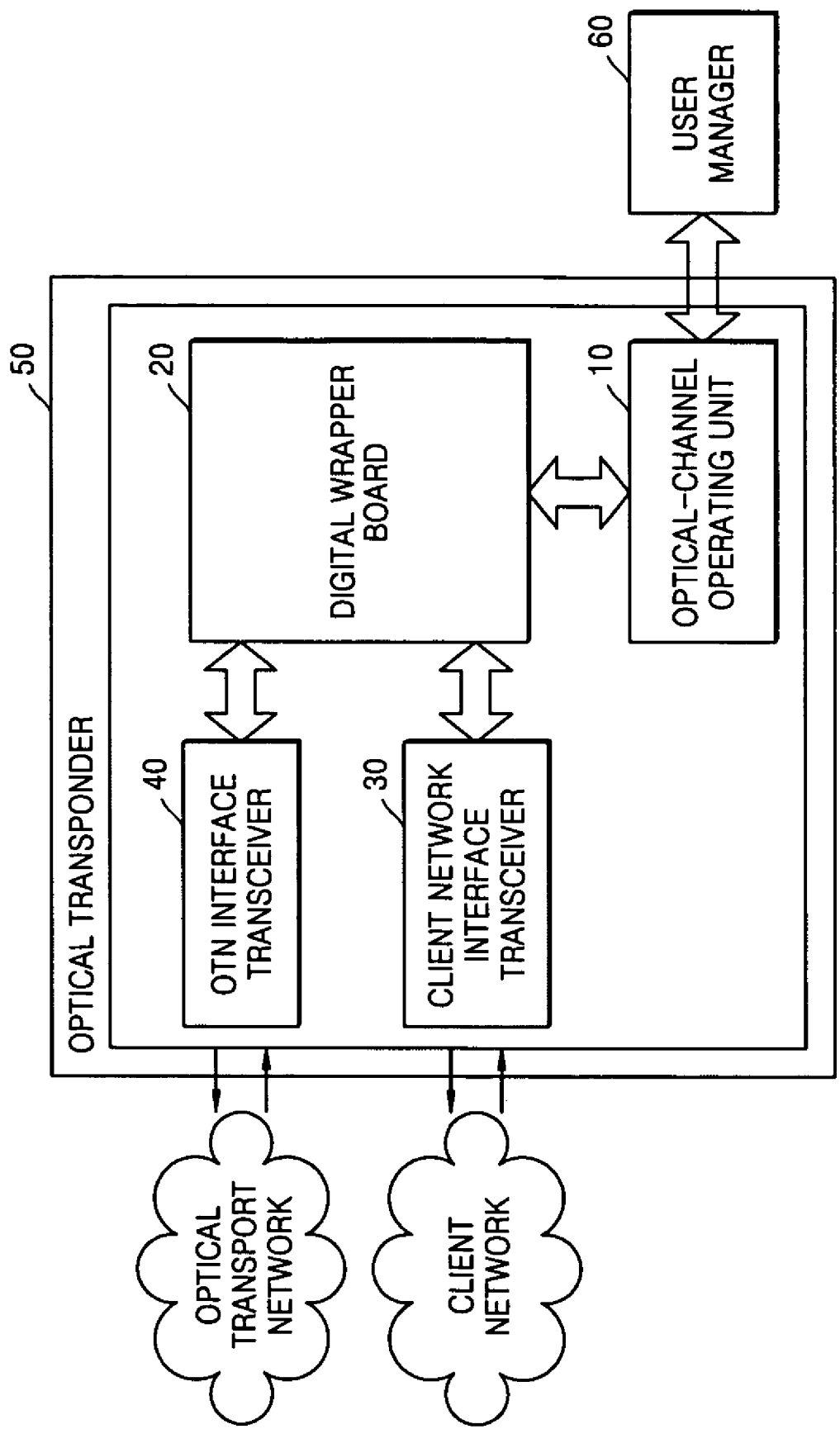
FIG. 1 is a block diagram of an optical transponder according to an embodiment of the present invention.

FIG. 1 is a block diagram of an optical transponder 50 according to an embodiment of the present invention. Referring to FIG. 1, the optical transponder 50 includes an optical-channel operating unit 10, a digital wrapper board 20, an optical client network interface transceiver 30, and an Optical Transport Network (OTN) interface transceiver 40.

The digital wrapper board 20 transmits a G.709 OTN frame to the client network interface transceiver 30 and the OTN interface transceiver 40 via an optical channel, as suggested in the ITU-T G.709 recommendation. The digital wrapper board 20 maps various tributary signals such as an SDH/SONET signal and an Ethernet interface signal, i.e., a G.709 OTN frame, which are transmitted from a client network, to a payload area of the optical channel, regardless of a frame structure. Then, the digital wrapper board 20 adds an overhead for Operation, Administration, and Maintenance (OAM) of the optical channel and an overhead for forward error correction (FEC) into the tributary signals and transmits the overhead-added tributary signals via an optical transport network. The added overheads enable OAM of and performance of the optical channel during signal transmission.

The optical-channel operating unit 10 operates the optical channel of the optical transponder 50. In this embodiment, the optical-channel operating unit 10 detects and treats an error in the optical channel. In this case, the detection and treatment of errors are performed in only layers of the optical channel in which changes of error status (i.e. error existence or nonexistence) occurs.

The G.709 frame has a substructure comprised of an Optical Transport Unit (OTU) k, an Optical Data Unit (ODU) k, and an Optical Payload Unit (OPU) k. The substructure is a digital wrapper area included in the transponder 50. Here, k denotes a value of 1, 2, or 3. When k is 1, 2, or 3, a data transmission rate of the above unit is 2.5 Gbps, 10 Gbps, or 40 Gbps.

Specifically, the G.709 OTN frame includes overhead areas, such as the OTUk, the ODUk, and the OPUk, which were newly added to the ITU-T standard for OAM of an optical channel; a payload area; and an FEC overhead area. In particular, the OTUk has a frame structure that allows Section Monitoring (SM) for managing and monitoring a signal in a 3R regeneration section and includes an FEC overhead. The ODU k has a frame structure that allows Path Monitoring (PM) along an end-to-end path and includes a Tandem Connection Monitoring overhead for monitoring connection of different networks.

Figure 2:
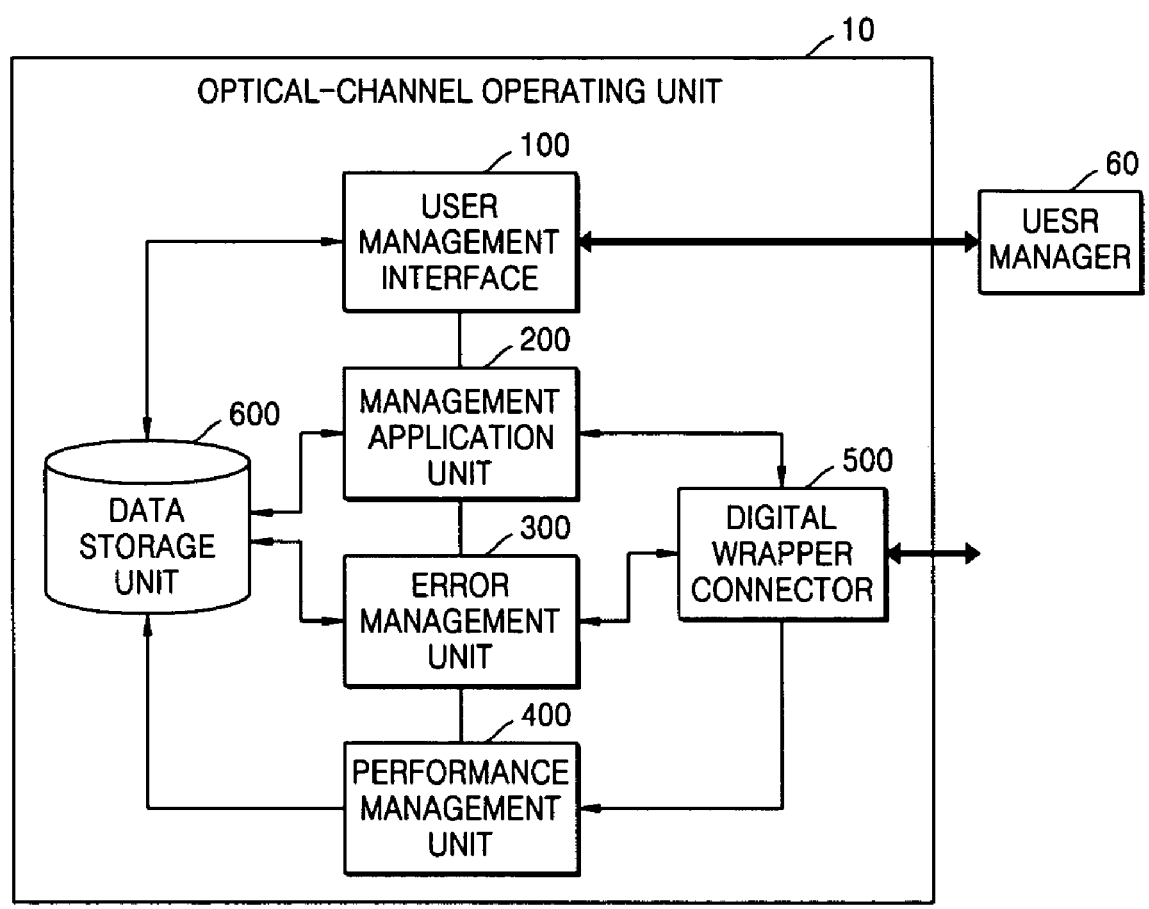
FIG. 2 is a detailed block diagram of an optical-channel operating unit of an optical transponder according to an embodiment of the present invention.

FIG. 2 is a detailed block diagram of the optical-channel operating unit 10 of the optical transponder 50, according to an embodiment of the present invention. Referring to FIG. 2, the optical-channel operating unit 10 includes a user management interface 100, a management application unit 200, an error management unit 300, a performance management unit 400, a digital wrapper connector 500, and a data storage unit 600.

The user management interface 100 sends a command input from a user manager 60 to the management application unit 200 and stores management data in the data storage unit 600. Also, the user management interface 100 provides the user manager 60 with optical channel management information from the management application unit 200 and the management information stored in the data storage unit 600.

The management application unit 200 controls operation of the optical channel and monitors the optical channel based on the management information stored in the data storage unit 600, in response to the command input via the user management interface 100. Also, the management application unit 200 stores a result of control or monitoring in the data storage unit 600.

The digital wrapper connector 500 accesses the G.709 OTN frame. Upon receiving an error message from the digital wrapper connector 500, the error management unit 300 detects and treats the error based on the management information stored in the data storage unit 600, and examines the correlation of errors occurring in sublayers of a layer containing the errors. Then, the digital wrapper connector 500 stores information regarding the error in the data storage unit 600.

The performance management unit 400 monitors the performances of sublayers of the optical channel, using the G.709 OTN frame accessed by the digital wrapper connector 500, and stores a result of monitoring in the data storage unit 600. Accordingly, information regarding management and performance of and errors occurring in the optical channel and the sublayers of the optical channel are stored in the data storage unit 600.

Figure 3:
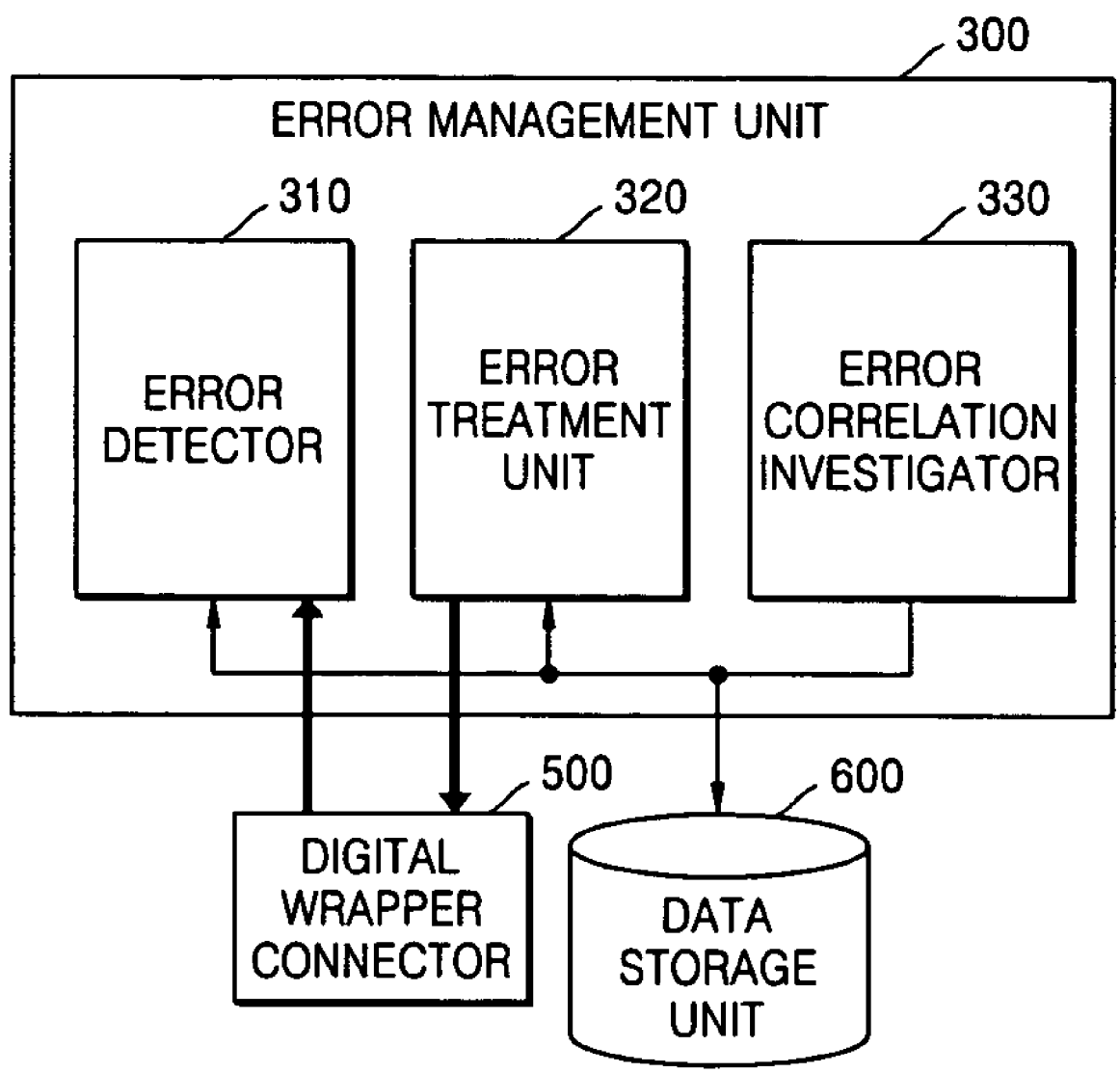
FIG. 3 is a detailed block diagram of an error management unit of FIG. 2.

FIG. 3 is a detailed block diagram of the error management unit 300 of FIG. 2. Referring to FIG. 3, the error management unit 300 includes an error detector 310, an error treatment unit 320, and an error correlation investigator 330.

In receipt of error messages from the digital wrapper connector 500, the error detector 310 detects the errors by determining whether an error signal or a maintenance signal is included in the G.709 OTN frame. When the error signal or the maintenance signal is detected or canceled, the error treatment unit 320 treats the errors within a related sublayer of the optical channel. The error correlation investigator 330 investigates a reason for the error based on the management information stored in the data storage unit 600 and stores a result of investigation in the data storage unit 600.

As will be described later, the error management unit 300 detects and treats an error from a lowermost sublayer $L_{low}$ to an uppermost sublayer $L_{high}$ of only a layer, rather than all layers, of the optical channel in which the error occurs, and investigates the correlation of errors in sublayers of a layer containing the errors.

Figure 4:
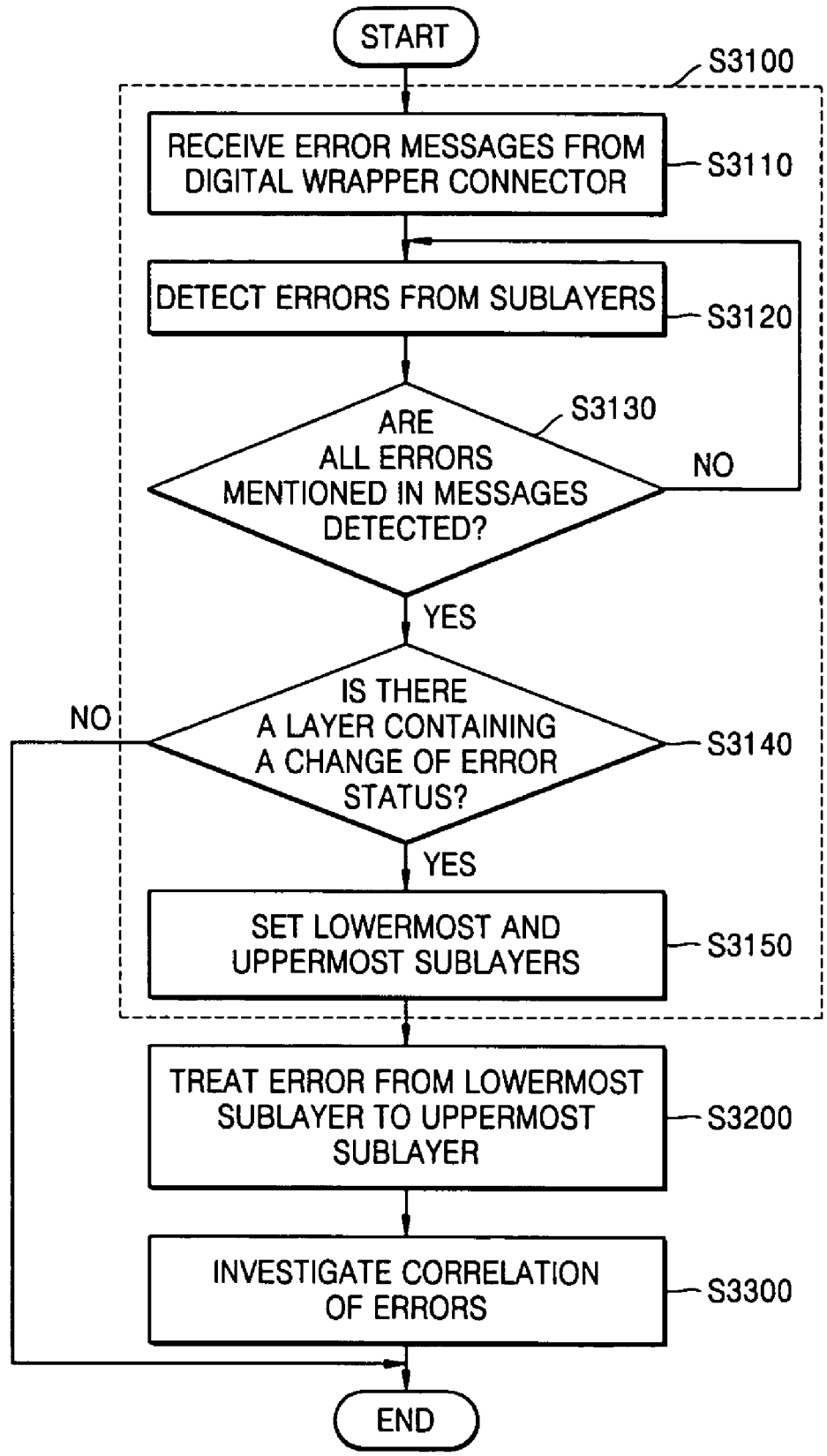
FIG. 4 is a flowchart illustrating a method of managing an error using the error management unit of FIG. 3.

FIG. 4 is a flowchart illustrating a method of managing an error in a G.709 OTN frame using the error management unit of FIG. 3. Referring to FIG. 4, the error detector 310 of the error management unit 300 detects an error from the G.709 OTN frame by determining whether an error signal or a maintenance signal is generated therein (S3100). Next, the error treatment unit 320 treats the error from a lowermost sublayer $L_{low}$ to an uppermost sublayer $L_{low}$ of a layer in which the error occurs (S3200). Next, the error correlation investigator 330 investigates a reason for the error in the layer in which the error is treated in S3200 (S3300).

More specifically, in S3100, the error detector 310, which has been in a standby mode, receives an error message from the digital wrapper connector 500 (S3110), and accesses an overhead region of the layer in which the error occurs so as to detect the error from sublayers of the layer (S3120).

Figure 5:
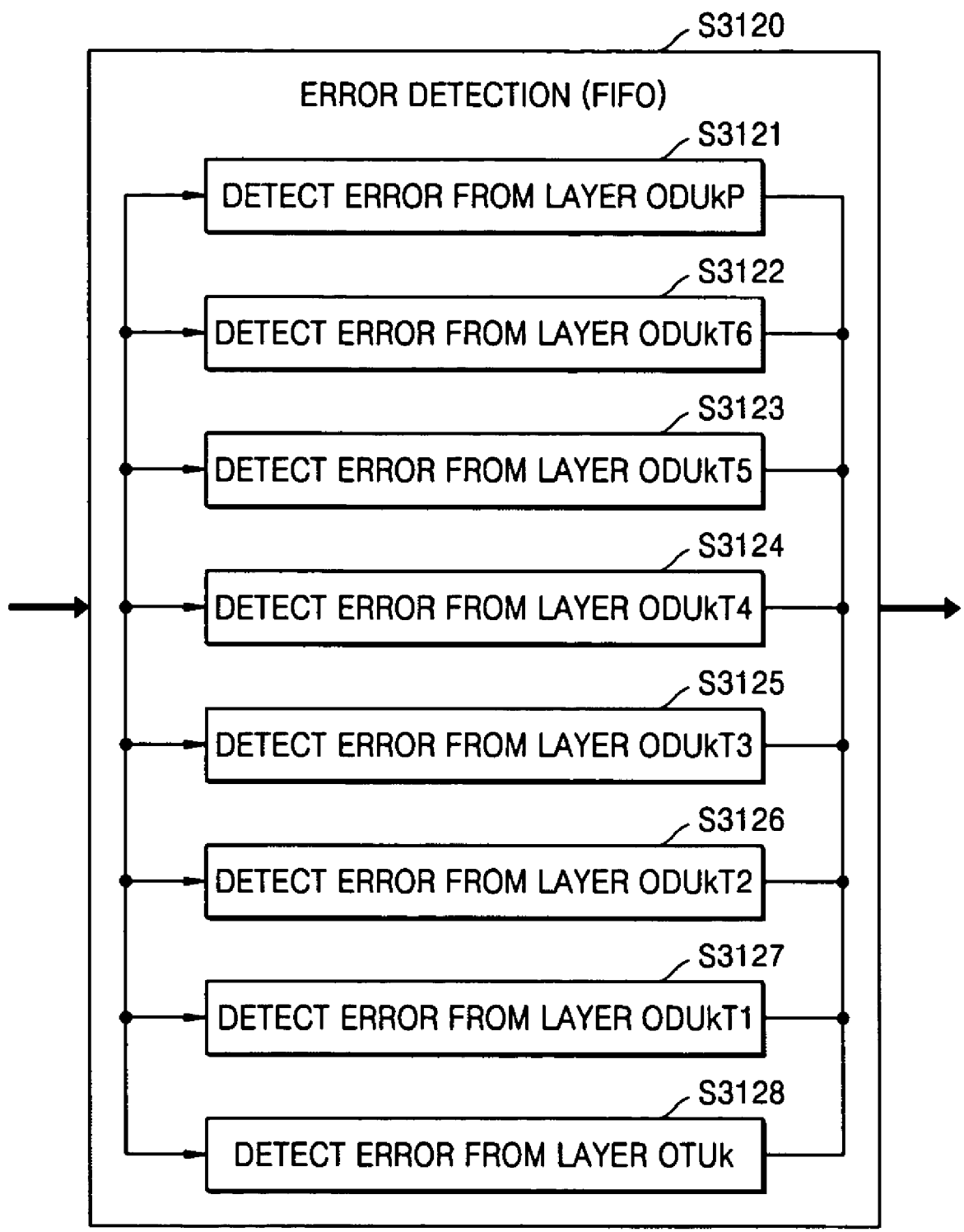
FIG. 5 illustrates a method of detecting an error from respective layers of an optical channel, performed in the method of FIG. 4.

FIG. 5 illustrates a method of detecting errors from all sublayers of a layer of an optical channel in which the error occurs, performed in operation 3120 of FIG. 4. Referring to FIG. 5, errors are detected from independent eight sublayers of the optical channel in S3120. That is, S3120 includes detecting an error from a layer ODUkP (S3121), detecting an error from a layer ODUkT6 (S3122), detecting an error from a layer ODUkT5 (S3123), detecting an error from a layer ODUkT4 (S3124), detecting an error from a layer ODUkT3 (S3125), detecting an error from a layer ODUkT2 (S3126), detecting an error from a layer ODUkT1 (S3127), and detecting an error from a layer OTUk (S3128).

The flowchart of FIG. 5 illustrates sequential detecting the errors from the respective sublayers in descending order for convenience. However, errors are substantially detected and treated from the sublayers in the sequence of input error messages according to a first-in first-out (FIFO) rule, regardless of the sequence of the sublayers. Types of errors of the respective sublayers that can be detected by the error detector 310 are listed in Table 1.

TABLE 1

| | |
|---|---|
| ODUkP Layer defect | dPLM (PayLoad Mismatch) |
| | dTIM (Trace Identifier Mismatch) |
| | dDEG (signal DEGraded) |
| | dBDI (Backward Defect Indication) |
| | dOCI (Open Connection Indication) |
| | dLCK (LoCKed signal) |
| | dAIS (Alarm Indication Signal) |
| ODUkT1-6 Layer defect | dTIM (Trace Identifier Mismatch) |
| | dDEG (signal DEGraded) |
| | dBDI (Backward Defect Indication) |
| | dIAE (Incoming Alignment Error) |
| | dBIAE (Backward Incoming Alignment Error) |
| | dLTC (Loss of Tandem Connection) |
| | dOCI (Open Connection Indication) |
| | dLCK (LoCKed signal) |
| | dAIS (Alarm Indication Signal) |
| OTUk Layer defect | dAIS (Alarm Indication Signal) |
| | dLOF (Loss of Frame) |
| | dLOM (Loss of Multi-frame) |
| | dTIM (Trace Identifier Mismatch) |
| | dDEG (signal DEGraded) |
| | dBDI (Backward Defect Indication) |
| | dIAE (Incoming Alignment Error) |
| | dBIAE (Backward Incoming Alignment Error) |

Referring to FIG. 4, after S3120, it is determined whether all the error messages are treated (S3130). If it is determined in S3130 that all the error messages are not treated, the method of FIG. 4 returns to S3120 and repeats detection of errors from the layers. When it is determined in S3130 that all the error messages are treated, it is determined whether there is a layer with a change of error status (i.e. error existence or nonexistence) (S3140).

If it is determined in S3140 that a layer with a change of error status presents, a lowermost sublayer $L_{low}$ and an uppermost sublayer $L_{high}$ in which the error is treated are set (S3150). The lowermost sublayer $L_{low}$ indicates a lowermost sublayer of the layer containing the change of error status, and the uppermost sublayer $L_{high}$ indicates an upper most sublayer terminated by the optical-channel operating unit 10.

After the error detector 310 detects the error from the sublayers (S3100), the error is treated from the lowermost sublayer $L_{low}$ to the uppermost sublayer $L_{high}$ (S3200) and reasons for the errors are hierarchically investigated in the sublayers of the layer (S3300).

Figure 6A:
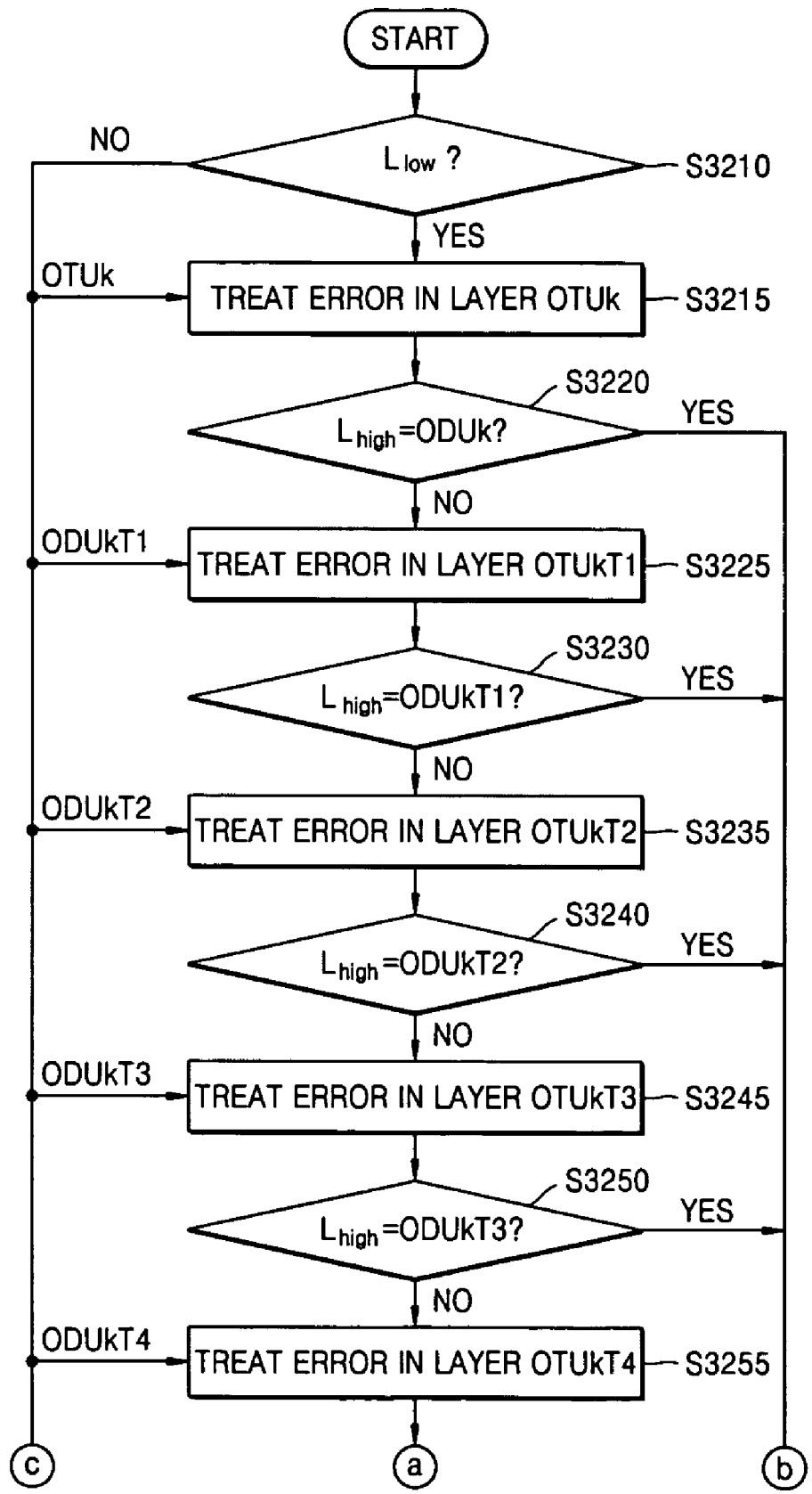
FIGS. 6A and 6B illustrate a flowchart of a method of treating an error from respective layers, performed in the method of FIG. 4.
Figure 6B:
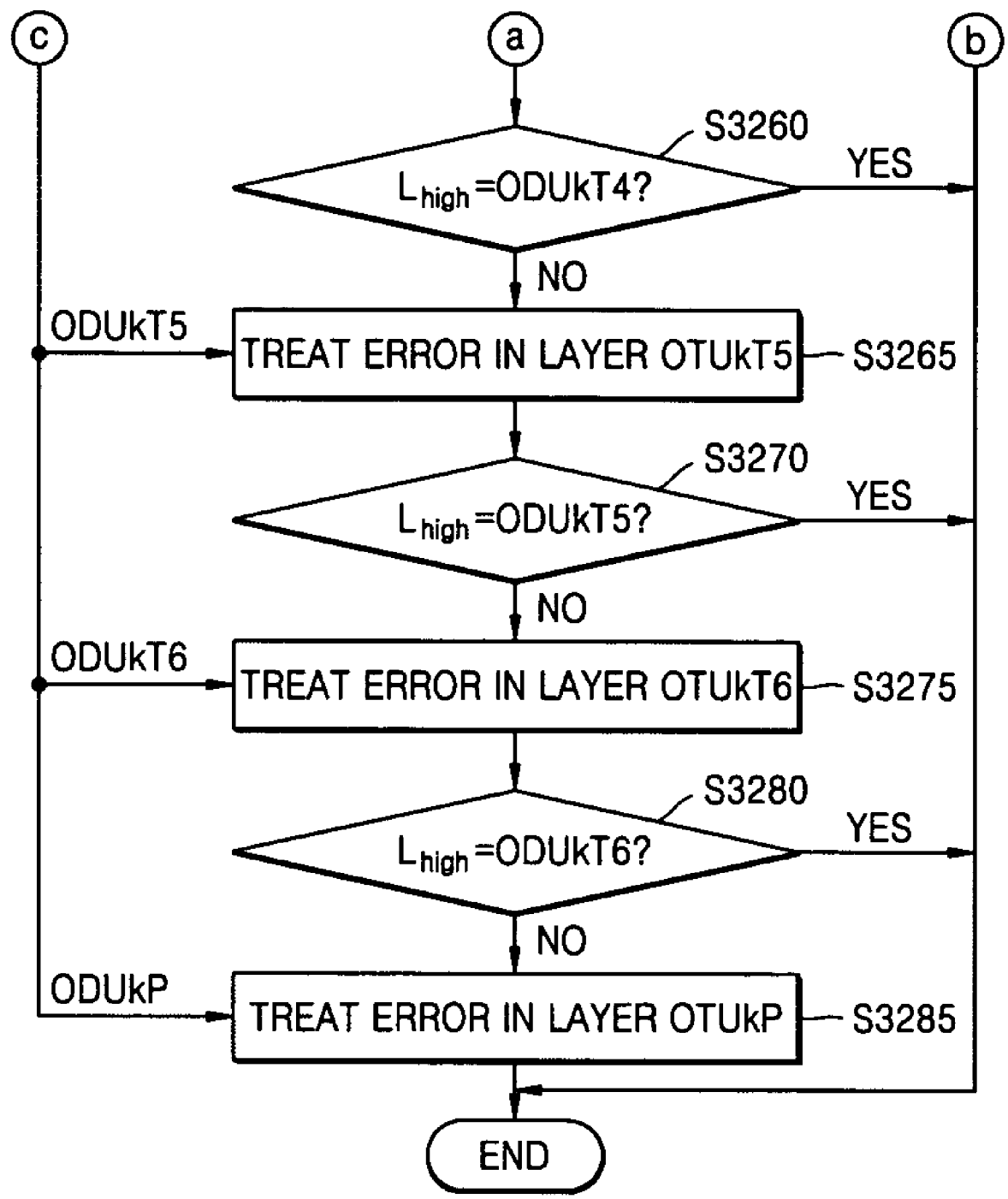

FIGS. 6A and 6B illustrate a flowchart illustrating a method of treating an error from the sublayers, performed in operation 3200 of FIG. 4. Referring to FIG. 6, the error treatment unit 320 checks the type of the lowermost sublayer $L_{low}$ of the layer with the error (S3210), treats the error from the lowermost sublayer $L_{low}$ to the uppermost sublayer $L_{high}$ (S3215 through S3285), and ends treating of the error.

More specifically, when the lowermost sublayer $L_{low}$ is determined to be a layer OTUk in S3210, error treatment related to the layer OTUk is performed (S3215). When the lowermost sublayer $L_{low}$ is determined to be a layer OTUkT1 in S3210, error treatment related to the OTUkT1 layer is performed (S3225). When the lowermost sublayer $L_{low}$ is determined to be a layer OTUkT2 in S3210, error treatment related to the layer OTUkT2 is performed (S3235). When the lowermost sublayer $L_{low}$ is determined to be a layer OTUkT3 in S3210, error treatment related to the layer OTUkT3 is performed (S3245). When the lowermost sublayer $L_{low}$ is determined to be a layer OTUkT4 in S3210, error treatment related to the layer OTUkT4 is performed (S3255). When the lowermost sublayer $L_{low}$ is determined to be a layer OTUkT5 in S3210, error treatment related to the layer OTUkT5 is performed (S3265). When the lowermost sublayer $L_{low}$ is determined to be a layer OTUkT6 in S3210, error treatment related to the layer OTUkT6 is performed (S3275). When the lowermost sublayer $L_{low}$ is determined to be a layer OTUkP in S3210, error treatment related to the layer OTUkP is performed (S3285).

Once the type of the lowermost sublayer $L_{low}$ is determined and error treatment is initiated, it is determined whether a current sublayer undergoing error treatment is the uppermost sublayer $L_{high}$. The error treatment is repeated until the error treatment is performed on the uppermost sublayer $L_{high}$.

For instance, when it is determined in S3210 that the lowermost sublayer $L_{low}$ is a layer OTUk, error treatment regarding the layer OTUk is performed (S3215). Next, it is determined whether the uppermost sublayer $L_{high}$ is also a layer OTUk (S3220). If it is determined in S3220 that the uppermost sublayer $L_{high}$ is the layer OTUk, error treatment is completed. If it is determined in S320 that the uppermost sublayer $L_{high}$ is not the layer OTUk, error treatment is performed on a layer ODUkT1 that is the next layer (S3225) and whether its uppermost sublayer $L_{high}$ is an layer ODUkT1 is determined (S3230). Next, when it is determined in S3230 that the uppermost sublayer $L_{high}$ is determined to be the layer ODUkT1, error treatment is completed. Otherwise, error treatment is performed on a layer ODUkT2 that is the next layer (S3235) and whether its uppermost sublayer $L_{high}$ is a layer ODUkT2 (S3240). Whether a layer is an uppermost sublayer $L_{high}$ is checked whenever error treatment is performed on the respective sublayers and repeated until a sublayer is determined to be an uppermost sublayer $L_{high}$ and error treatment is completed.

Backward error indication (BDI) functions, i.e., insertion of or cancellation of BDI for error treatment, must be independently performed backwards by the error treatment unit 320. That is, this error treatment performs BDI functions from the lowermost sublayer $L_{low}$ to the uppermost sublayer $L_{high}$. However, alarm indication signal (AIS) functions for error treatment (i.e., insertion of or cancellation of AIS) that is performed forwards by the error treatment unit 320, is performed only in the uppermost sublayer $L_{high}$.

Treatment of errors that must be treated forwards is performed in a direction in which a signal is transmitted. An effect obtained when performing treatment of AIS from the lowermost sublayer $L_{low}$ to the uppermost sublayer $L_{high}$, is the same as that obtained when performing error treatment only in the uppermost sublayer $L_{high}$. For this reason, according to the present invention, treatment of such errors is performed only in an uppermost sublayer $L_{high}$ of a layer containing an error. Accordingly, it is possible to inform a user of the occurrence of errors backwards and forwards without performing error treatment on layers in which no error occurs by the error treatment unit 320.

After the error treatment, the error correlation investigator 330 investigates a reason for the error (S3300). Although not shown in the drawings, similarly to the method of FIGS. 6A and 6B, the error correlation investigator 330 determines the type of a lowermost sublayer $L_{low}$ of the layer containing the error, investigates correlation of the errors from lowermost sublayer $L_{low}$ to an uppermost sublayer $L_{high}$, and stores a result of investigation in the data storage unit 600. In this case, the error correlation changes in a section between only from the lowermost sublayer $L_{low}$ and the uppermost sublayer $L_{high}$ of the layer, and does not change in the other layers. Accordingly, according to the present invention, error correlation is investigated only in the sublayers of a layer where error correlation changes, thereby effectively informing a user manager of a reason for the error without wasting resources.

As described above, in an optical transponder and a method of detecting and treating an error in its optical channel sublayers, according to the present invention, an error management unit of the optical transponder is comprised of independent blocks, such as an error detector, an error treatment unit, an error correlation detector, so as to independently operate maximum eight optical channel sublayers and effectively manage errors that are increased in proportion to a number of sublayers, thereby performing error treatment on the eight optical channel sublayers.

According to the present invention, a layer of an optical channel in which errors occur is detected, errors are treated from an uppermost sublayer of only the layer to its lowermost sublayer, and the correlation of errors is investigated in the sublayers. Accordingly, it is possible to quickly inform a user of information regarding errors occurring in a layer of an optical channel and effectively treat the errors, thereby reducing load weighing on an optical-channel operating unit of the optical transponder.

The present invention can be embodied as a computer readable code stored in a computer readable medium. Here, the computer readable medium may be any recording apparatus capable of storing data that can be read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable recording medium can be distributed among computer systems that are interconnected through a network, and the present invention may be stored and implemented as a computer readable code in the distributed system.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An optical transponder comprising an optical-channel operating unit, wherein the optical-channel operating unit comprises:
    an error detector detecting an error signal or a maintenance signal from an optical transport network frame that includes an overhead for operation, administration, and maintenance of an optical channel and an overhead for forward error correction, wherein the error detector independently detects the errors from respective sublayers of the layer;
    an error treatment unit treating errors in a predetermined layer of a plurality of channels that requires error treatment when the error signal or the maintenance signal is detected or canceled; and
    an error correlation investigator investigating a reason for the errors in the predetermined layer.

2. The optical transponder of claim 1, wherein the error detector determines whether errors occur in the layer by accessing the overhead of the optical transport network frame, and sets a lowermost sublayer and an uppermost sublayer of the layer where the error treatment is required.

3. The optical transponder of claim 2, wherein the lowermost sublayer is a lowermost sublayer of the layer containing the errors, and the uppermost sublayer is an uppermost layer terminated by the optical-channel operating unit.

4. The optical transponder of claim 2, wherein the error treatment unit checks a type of the lowermost sublayer and hierarchically performs error treatment from the lowermost sublayer to the uppermost sublayer.

5. The optical transponder of claim 2, wherein the error treatment unit performs backward defect indication functions for error treatment backwards from the lowermost sublayer to the uppermost sublayer, and performs alarm indicating signal functions only in the uppermost sublayer.

6. The optical transponder of claim 2, wherein the error correlation detector cheeks a type of the lowermost sublayer and hierarchically detects correlation of the errors from the lowermost sublayer to the uppermost sublayer.

7. The optical transponder of claim 1, wherein the error detector substantially detects and treats the errors from the sublayers in sequence of input error messages according to a first-in first-out (FIFO) rule, regardless of the sequence of the sublayers.

8. A method of detecting and treating errors in an optical-channel sublayers of an optical transponder, comprising:
    (a) detecting an error signal or a maintenance signal from an optical transport network frame that includes an overhead for operation, administration, and maintenance of an optical channel and an overhead for forward error correction, wherein the errors are independently detected from respective optical-channel sublayers;
    (b) treating errors in a predetermined layer of a plurality of layers that requires error treatment when the error signal or the maintenance signal is detected or canceled; and
    (c) investigating a reason for the errors in the predetermined layer.

9. The method of claim 8, wherein (a) comprises:
    (a1) receiving the overheads of the optical transport network frame through the layer;
    (a2) determining whether errors occur in the layer by accessing overheads of the optical transport network frame; and
    (a3) setting a lowermost sublayer and an uppermost sublayer of each of the layers.

10. The method of claim 9, wherein the lowermost sublayer is a lowermost sublayer of the layer containing the errors, and the uppermost sublayer is an uppermost layer terminated by the optical-channel operating unit.

11. The method of claim 9, wherein (b) comprises:
    (b1) checking a type of the lowermost sublayer and performing hierarchical error treatment starting from the lowermost sublayer;
    (b2) determining whether a sublayer undergoing error treatment is the uppermost sublayer; and
    (b3) completing the hierarchical error treatment when the sublayer undergoing error treatment is determined to the uppermost sublayer.

12. The method of claim 9, wherein (b) comprises performing backward defect indication functions for error treatment backwards from the lowermost sublayer to the uppermost sublayer, and alarm indication signal functions only in the uppermost sublayer.

13. The method of claim 9, wherein (c) comprises:
    (c1) checking a type of the lowermost sublayer and investigating correlation of the errors starting from the lowermost sublayer;

(c2) determining whether a sublayer from which the correlation of errors is investigated is the uppermost sublayer; and (c3) completing the investigation of the correlation of errors when the sublayer from which the correlation of errors is investigated is the uppermost sublayer.

14. The method of claim 8, wherein the errors are sequentially detected in sequence of input error messages according to a first-in first-out (FIFO) rule, regardless of sequence of the sublayers.

* * * * *